(12) United States Patent
Swartling et al.

(10) Patent No.: US 8,880,304 B2
(45) Date of Patent: Nov. 4, 2014

(54) METHOD FOR DETERMINATION OF NUMBERS OF GEAR STEPS

(75) Inventors: Fredrik Swartling, Södertälje (SE); Anders Kjell, Bromma (SE); Tom Nyström, Södertälje (SE)

(73) Assignee: Scania CV AB (SE)

( * ) Notice: Subject to any disclaimer, the term of this patent is extended or adjusted under 35 U.S.C. 154(b) by 160 days.

(21) Appl. No.: 13/393,358

(22) PCT Filed: Sep. 13, 2010

(86) PCT No.: PCT/SE2010/050970
§ 371 (c)(1), (2), (4) Date: Feb. 29, 2012

(87) PCT Pub. No.: WO2011/031227
PCT Pub. Date: Mar. 17, 2011

(65) Prior Publication Data
US 2012/0173095 A1 Jul. 5, 2012

(30) Foreign Application Priority Data
Sep. 14, 2009 (SE) .................................. 0950656

(51) Int. Cl.
*G06F 17/00* (2006.01)
*F16H 61/02* (2006.01)
*F16H 59/48* (2006.01)
*F16H 59/52* (2006.01)

(52) U.S. Cl.
CPC .... *F16H 61/0213* (2013.01); *F16H 2061/0218* (2013.01); *F16H 59/48* (2013.01); *F16H 2061/0216* (2013.01); *F16H 59/52* (2013.01)
USPC ........ 701/51; 701/1; 701/36; 701/55; 701/56; 701/58; 701/60; 701/61

(58) Field of Classification Search
USPC .................. 701/51, 55, 56, 58, 60, 61, 1, 36; 477/115; 73/115.02
See application file for complete search history.

(56) References Cited

U.S. PATENT DOCUMENTS

| 4,947,331 A | 8/1990 | Speranza ................... 364/424.1 |
| 5,036,730 A | 8/1991 | Sakai et al. ..................... 74/866 |

(Continued)

FOREIGN PATENT DOCUMENTS

| DE | 101 06 935 | 8/2002 |
| EP | 0 238 310 | 9/1987 |
| EP | 0 352 551 A2 | 1/1990 |

OTHER PUBLICATIONS

Supplementary Search Report dated Aug. 19, 2013 issued in corresponding European Patent Application No. 10815710.8.

(Continued)

*Primary Examiner* — Khoi Tran
*Assistant Examiner* — Robert Nguyen
(74) *Attorney, Agent, or Firm* — Ostrolenk Faber LLP

(57) ABSTRACT

A method for determining numbers of gear steps N for a gearbox in a motor vehicle. The vehicle has an engine connected to drive the gearbox. The numbers of gear steps N is the number of downshifts or the number of upshifts which the gearbox effects at an upshift point or a downshift point. A downshift point represents a first engine speed at which the gearbox effects a downshift. An upshift point represents a second engine speed at which the gearbox effects an upshift. The numbers of gear steps N are determined on the basis of a predicted acceleration a for the motor vehicle during a time period T. The invention relates also to a system, a motor vehicle, a computer program and a computer program product thereof for performing the method.

15 Claims, 3 Drawing Sheets

(56) References Cited

U.S. PATENT DOCUMENTS

| | | | | |
|---|---|---|---|---|
| 6,067,495 | A | * | 5/2000 | Fliearman et al. .............. 701/55 |
| 6,325,743 | B1 | * | 12/2001 | Genise et al. ................. 477/124 |
| 8,121,764 | B2 | * | 2/2012 | Yamada .......................... 701/51 |
| 2008/0027613 | A1 | * | 1/2008 | Bai et al. ......................... 701/55 |
| 2008/0058159 | A1 | * | 3/2008 | Watanabe et al. ............. 477/156 |
| 2008/0249693 | A1 | | 10/2008 | Kresse ........................... 701/61 |
| 2009/0270224 | A1 | * | 10/2009 | Minami ........................ 477/101 |

OTHER PUBLICATIONS

International Search Report mailed Dec. 20, 2011 in corresponding PCT International Application No. PCT/SE2010/050970.

* cited by examiner

METHOD FOR DETERMINATION OF NUMBERS OF GEAR STEPS

CROSS-REFERENCE TO RELATED APPLICATIONS

The present application is a 35 U.S.C. §§371 national phase conversion of PCT/SE2010/050970, filed Sep. 13, 2010, which claims priority of Swedish Application No. 0950656-9, filed Sep. 14, 2009, the contents of which are incorporated by reference herein. The PCT International Application was published in the English language.

TECHNICAL FIELD

The present invention relates to a method for determination of numbers of gear steps for a gearbox in a motor vehicle. The invention further relates to a system, a motor vehicle, a computer program and a computer program product thereof.

BACKGROUND TO THE INVENTION

FIG. 1 depicts schematically parts of a power train for a motor vehicle 1, such as a passenger car or a motor vehicle, e.g. a truck or bus. The power train comprises an engine 10 mechanically connected by a shaft to a first end of a gearbox 20 via a clutch device 40. The gearbox 20 is also mechanically connected, at its other end, by a propeller shaft 50 to a differential gear 30 associated with a rear axle. The rear axle comprises respective left and right drive shafts 60 which drive the vehicle's powered wheels (not depicted in the diagram).

With this well-known arrangement, the mechanical work of the engine 10 is transmitted via various transmission devices (e.g. clutch device 40, gearbox 20, propeller shaft 50, differential gear 30 and drive shafts 60) to powered wheels in order to move the vehicle 1. An important device in the power train is the gearbox 20, which has a number of forward gears for moving the motor vehicle 1 forward, and usually also one or more reverse gears. The number of forward gears varies but modern kinds of trucks are usually provided with twelve forward gears.

The gearbox 20 may be of manual or automatic type (automatic gearbox), but also of the automatic manual gearbox type (automatic manual transmission, AMT). Automatic gearboxes and automatic manual gearboxes are automated gearbox systems usually controlled by a control unit 110 (sometimes also called electronic control unit, ECU) which is adapted to controlling the gearbox 20, e.g. during gear changing, as when choosing gears at a certain vehicle speed with a certain running resistance. The ECU may measure engine speed and the state of the gearbox 20 and control the latter by means of solenoid valves connected to compressed air devices. Information about the engine 10, e.g. its speed and torque, is also sent from the engine 10 to the ECU, e.g. via a CAN (controller area network) bus.

In conventional gear change systems, the control unit 110 uses tabulated engine speed limits, also called shift points, which represent the engine speed at which a downshift or upshift should be effected in the gearbox 20, i.e. the vehicle 1 changes gear when the speed of its engine 10 passes a speed represented by a shift point. The shift points may therefore be construed as providing information not only about when a downshift or upshift should take place but also about the number of gear steps to be effected at each downshift or upshift. It is usual for each shift point to comprise one to three gear steps, but more gear steps are possible.

FIG. 2 depicts schematically an example of various tabulated shift points represented by lines SP1-SP6 in a graph where the x axis represents engine torque and the y axis the speed of the engine 10 in revolutions per minute (rpm). So long as the engine speed is between shift lines SP1 and SP4, no gear change takes place, but if it rises above an upshift line, SP1-SP3, an upshift is initiated, and similarly a downshift is initiated if the engine speed drops below a downshift line, SP4-SP6. Table 1 below shows a number of upward or downward gear steps for each of the lines SP1-SP6. For example, an upshift by one step takes place if the engine speed rises above line SP1 and a downshift by two steps if the engine speed drops below line SP5.

TABLE 1

| Downshift and upshift lines SP1-SP6 | |
|---|---|
| SP1 | Engine speed for upshift by 1 step |
| SP2 | Engine speed for upshift by 2 steps |
| SP3 | Engine speed for upshift by 3 steps |
| SP4 | Engine speed for downshift by 1 step |
| SP5 | Engine speed for downshift by 2 steps |
| SP6 | Engine speed for downshift by 3 steps |

Shift point choices affect inter alia the running characteristics and fuel consumption for the vehicle 1, so shift points have to be accurately calibrated by vehicle manufacturers. Their calibration involves various gearshift strategies being tested in the field in different driving situations, e.g. with different amounts of acceleration applied, different road gradients and different vehicle-combination weights. The test results have thereafter to be thoroughly analysed to determine appropriate shift points.

Numbers of gear steps in conventional systems are also arrived at by regularly measuring the acceleration of the vehicle 1 and using the measured data to determine numbers of steps. In such conventional systems, high measured acceleration leads to more steps and low measured acceleration to fewer steps. The measured acceleration is thereafter compared with various acceleration threshold values stored in tables, and the determination of said threshold values decides how many steps should be executed when changing gear in a given driving situation. The threshold values are engine-dependent and therefore suited to a specific engine 10. Determining appropriate threshold values involves the manufacturers of vehicles carrying out extensive calibrations in order to arrive at them. The calibration procedure is both expensive and time-consuming. It is also not uncommon that using tabulated acceleration threshold values leads to adopting wrong numbers of gear steps.

BRIEF DESCRIPTION OF THE INVENTION

An object of the present invention is to propose an alternative method for determining numbers of gear steps required when changing gear in a gearbox. Another object of the invention is to propose a method which totally or partly solves the problems of the state of the art.

According to an aspect of the invention, the above objects are achieved with a method for determination of numbers of gear steps N for a gearbox in a motor vehicle which comprises an engine connected to drive said gearbox, said numbers of gear steps N being the number of downshifts or the number of upshifts which said gearbox respectively effects at a downshift or upshift point, where a downshift point represents a first engine speed at which said gearbox effects a downshift, an upshift point represents a second engine speed at which said gearbox effects an upshift, and said numbers of gear steps N are determined on the basis of a predicted acceleration a for said vehicle during a time period T.

The invention further relates to a computer program comprising program code which, when said program code is executed in a computer, causes said computer to effect the method. The invention further relates to a computer program product belonging to the computer program.

According to another aspect of the invention, the above objects are achieved with a system for determination of numbers of gear steps N, comprising at least one control unit adapted to controlling a gearbox in a motor vehicle which comprises an engine connected to drive said gearbox, said numbers of gear steps N being the number of downshifts or the number of upshifts which said gearbox respectively effects at an upshift point or a downshift point, where a downshift point represents a first engine speed at which said gearbox effects a downshift, and an upshift point represents a second engine speed at which said gearbox effects an upshift. Said system is further adapted to determining said numbers of gear steps N on the basis of a predicted acceleration a for said vehicle during a time period T.

The system according to the invention may also be modified according to the various embodiments of the above method. The invention further relates to a motor vehicle 1 which comprises at least one system as described above.

An advantage of the invention is that a more adequate measure of acceleration is provided for determination of numbers of gear steps. This acceleration measure is based on an estimate of the vehicle's acceleration. Relevant physical and mechanical parameters can therefore be taken into account. This makes it possible to reduce the number of incorrect gear step choices, resulting in lower fuel consumption, better drivability etc. Another advantage of the invention is that determining the number of gear steps can be done more quickly with the method and the system according to the invention than according to the state of the art, since measurements of the vehicle's acceleration become superfluous.

Further advantages and applications of a method and a system according to the invention are indicated by the detailed description set out below.

BRIEF DESCRIPTION OF THE DRAWINGS

In the detailed description of the invention set out below, embodiments of the invention are described with reference to the attached drawings, in which.

DETAILED DESCRIPTION OF THE INVENTION

Figure 1:
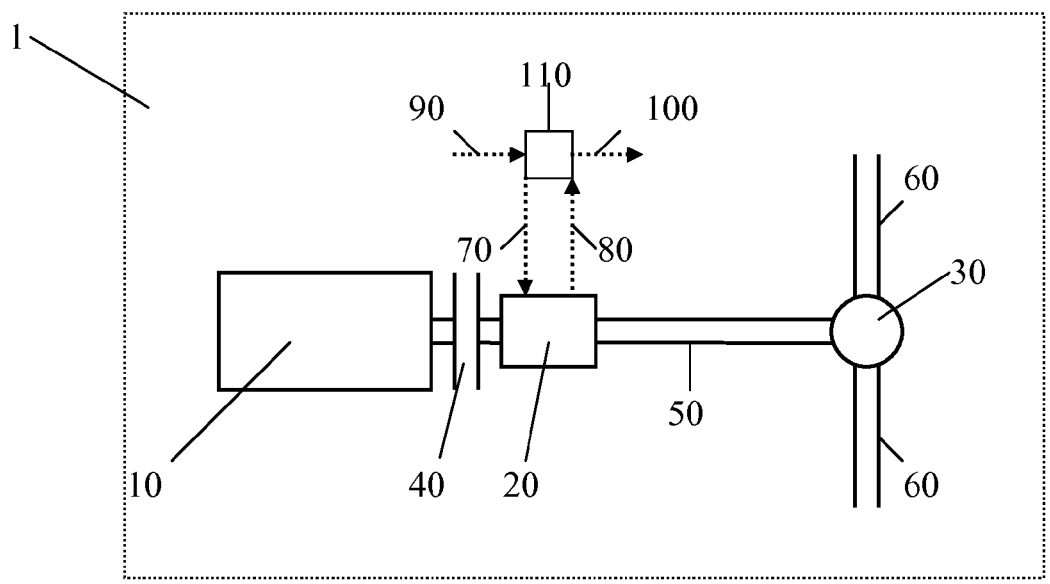
FIG. 1 depicts schematically part of a power train for a motor vehicle.
Figure 2:
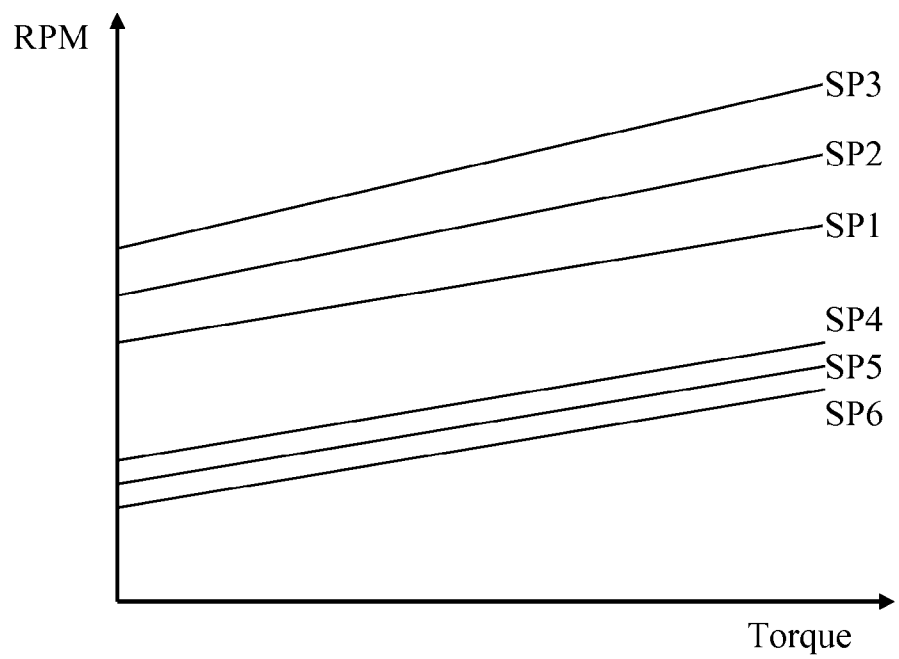
FIG. 2 is a schematic graph of downshift and upshift lines.

As indicated by the above background description, the number of gear steps in conventional systems is determined by regularly measuring the acceleration of the motor vehicle 1. This procedure does not take into account certain factual circumstances which affect the adequacy of measured acceleration as an input parameter for determining the number of gear steps. For example, the acceleration may vary when the engine speed increases, when a vehicle 1 accelerates. This variation may be because the torque delivered by the engine 10 varies between different engine speeds. Therefore, if the acceleration is low at low engine speed, it may appear that the acceleration is sufficient when the engine 10 approaches its maximum power output speed, i.e. its speed at which it delivers the greatest power. Making good step choices (numbers of gear steps) therefore entails having to adapt the threshold values for the acceleration so that they assume low enough values to allow appropriate step choices at the speeds at which the engine 10 delivers least power.

Another factor affecting the number of gear steps is the effect of applying rapid acceleration to engines 10 with turbochargers. Turbocharged engines 10 do not deliver full torque until they have built up sufficient air flow through the turbocharger, which means that if changing gear in such a situation is adopted the acceleration of the vehicle 1 will not correspond to the power which is available with the turbocharger after a certain time.

These and other factors result in considerable risk that conventional gear change systems may choose incorrect numbers of gear steps because measured acceleration is not an optimum input parameter for determining the number of gear steps. The acceleration measurement procedure also leads to delay in determining the number of gear steps, since signals from acceleration measuring sensors have to be analysed before they can be used in gear step choice determination. Using measured acceleration as in the state of the art may therefore lead to incorrect gear step choices because of delayed availability of measurement results.

In contrast, the solution according to the invention is based on assumptions about certain mathematical relationships between various physical and mechanical magnitudes which affect the acceleration of the vehicle 1. Based on these assumptions it is possible to derive a predicted acceleration a which is then used in determining numbers of gear steps N for changing gear in a gearbox 20 in a vehicle 1. The gearbox 20 is preferably of the kind which forms part of an automated gear change system controlled by a control unit 110, e.g. an ECU. In such a gear change system, gears are changed automatically by the control unit 110, but it is also usual for the driver to be able to execute manual gear changes in such a system, which is known as manual gear change in automatic state (automatic mode). The gearbox 20 also has a plurality of gears, e.g. twelve forward gears and one or more reverse gears are usual in modern trucks. The number of gear steps N may vary but is preferably somewhere between one and eight.

Using a predicted acceleration a provides an input parameter which more adequately represents the acceleration of the vehicle 1 for determination of the number of gear steps N. More adequate in this context means that using predicted acceleration a results in better determinations of the number of steps N for gear changes, since the predicted acceleration a is a more correct and more precise measure for gear step choice determination. The predicted acceleration a may preferably be used as an acceleration threshold value in step choice determination, which means that different acceleration threshold values represent different numbers of gear steps N.

A basic concept of the invention is to use a predicted acceleration a for determining the number of gear steps N, which acceleration a is predicted during a time period T which is the time an engine 10 takes to change from a current engine speed $\omega_1$ at a first point in time to an engine speed $\omega_2$ at which an upshift or downshift is initiated at a second point in time.

The present invention thus proposes an alternative and better method for determination of numbers of gear steps N for a gearbox 20. As described above, the reason is that predicted acceleration a is a more adequate measure for gear step choice determination because, unlike the state of the art, it predicts the behaviour of the vehicle 1.

According to an embodiment of the invention, the acceleration a is predicted by using a time period T according to the relationship in equation (1)

$$a = \frac{\Delta \omega}{T} \quad (1)$$

where $\Delta\omega=\omega_2-\omega_1$, i.e. the difference between a current engine speed and the engine speed for initiating a gear change. This predicted acceleration a is the mean acceleration of the vehicle 1 during the time period T.

According to another embodiment of the invention, the time period T is determined on the basis of assuming the relationships in equations (2) to (4)

$$M = J\dot{\omega} \quad (2)$$

$$M = M_e - \frac{F_{res}r}{i} \quad (3)$$

$$J = m + I_e \frac{i^2}{r^2} \quad (4)$$

where M is accelerating torque, J the vehicle's inertia, $\omega$ the engine speed, $M_e$ the torque for the engine's flywheel, $F_{res}$ running resistance, r the wheel radius, i total transmission ratio, m the weight of the vehicle and $I_e$ the engine's moment of inertia; which relationships are expressed by equation (5)

$$\frac{d\omega}{dt} = \dot{\omega} = \frac{M}{J} = \frac{M_e - \frac{F_{res}r}{i}}{m + I_e \frac{i^2}{r^2}} \quad (5)$$

resulting finally in the time period T according to equation (6)

$$T = \int_{\omega_1}^{\omega_2} \frac{m + I_e \frac{i^2}{r^2}}{M_e - \frac{F_{res}r}{i}} d\omega \quad (6)$$

The predicted acceleration a may also, according to a further embodiment, be calculated in real time, e.g. by a control unit such as an ECU, by means of the above equations. The result is immediate adjustment of the choice of the number of gear steps N to changed running conditions for the vehicle 1.

Figure 3:
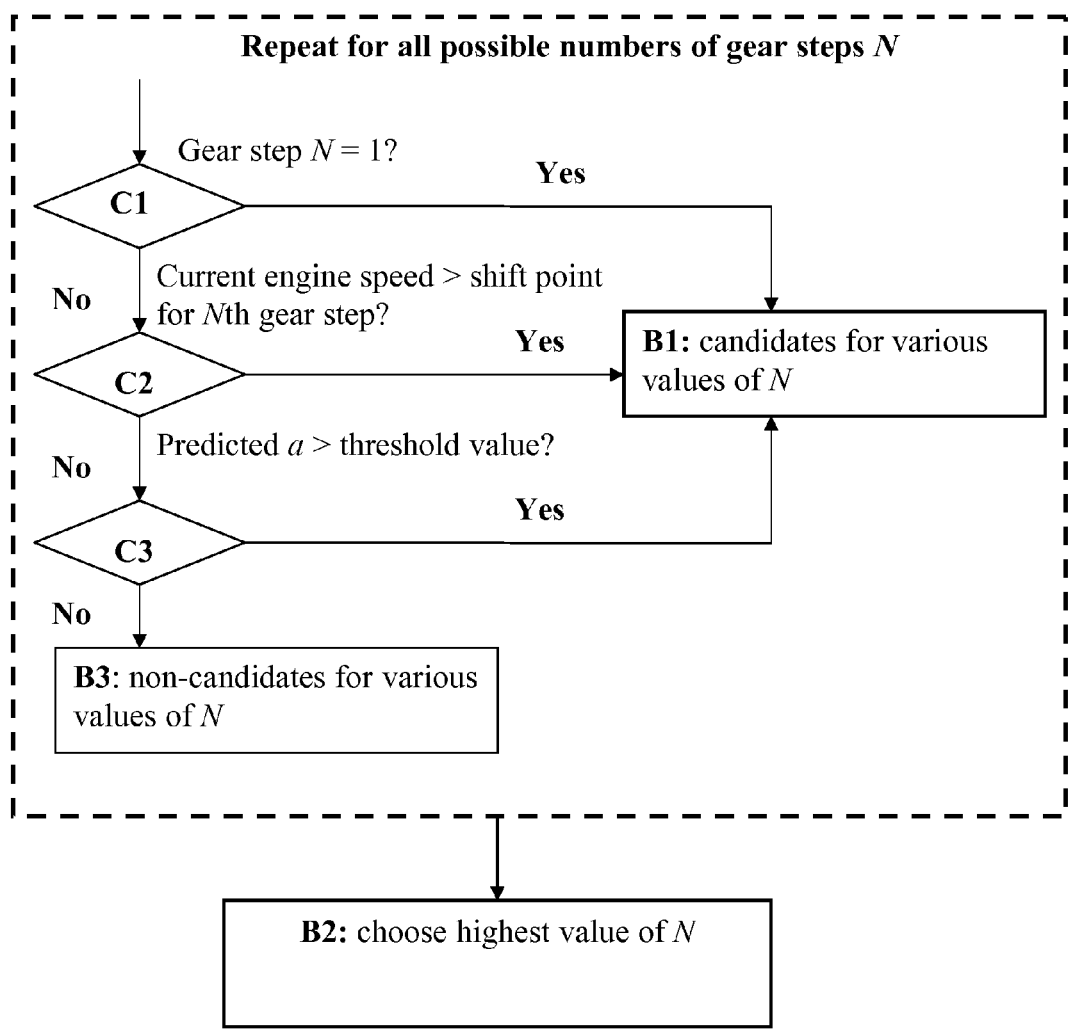
FIG. 3 is a flowchart of an embodiment of the invention.

An embodiment of the invention is described below with reference to the flowchart in FIG. 3. FIG. 3 illustrates the steps of choosing numbers of gear steps in an upshift. Choosing numbers of gear steps N as a function of a predicted acceleration a comprises, in this embodiment, calculating a predicted mean acceleration a for each number of gear steps N with associated shift points. This is followed by checking which gear steps N result in good ride comfort, which may be expressed as driver and passengers feeling that the gear system changes gear harmoniously. For example, for a chosen gear to provide good ride comfort, any of the three following conditions has to be fulfilled:

number of gear steps N=1, since at least one possible candidate gear is always required, current engine speed being higher than the shift point for the Nth gear step, or predicted mean acceleration a between current engine speed and the shift point for the Nth gear step being higher than a predetermined threshold value, where the reason for having acceleration threshold values is that long gear steps (large values of N) are only felt to be good if the shift points are reached quickly, i.e. with high acceleration.

These three conditions correspond to C1-C3 in FIG. 3. Values of N which fulfil any of them go into box B1 on the right in FIG. 3, which contains all possible candidates for various values of N. Values of N which do not fulfil any of the three conditions end up in box B3 with all of the non-candidates. Finally, which of all the N candidates assumes the highest value is determined in box B2. On the above reasoning, N=1 will always be a candidate. For example, if N=1, 2, 3, 4 are possible candidates for the number of gear steps, the gear system will choose N=4 according to this embodiment.

Still referring to FIG. 3, choosing numbers of gear steps at a downshift, according to an embodiment of the invention, is done by determining whether the current engine speed is less than the shift point for the Nth gear step (at C2) and whether the predicted mean deceleration (the absolute value of the predicted mean acceleration a in this case) is higher than a predetermined threshold value (at C3).

Specialists will also appreciate that a method for determination of numbers of gear steps N according to the present invention might also be implemented in a computer program which, when executed in a computer, causes the computer to effect the method. The computer program is contained in a computer programme program product's computer-readable medium which takes the form of a suitable memory, e.g. ROM (read-only memory), PROM (programmable read-only memory), EPROM (erasable PROM), flash memory, EEPROM (electrically erasable PROM), hard disc unit, etc.

The invention relates also to a system for determination of numbers of gear steps N. The system comprises at least one control unit 110 (e.g. an ECU for a gearbox 20) adapted to controlling a gearbox 20 in a motor vehicle 1. The gearbox 20 is connected to an engine 10 which drives the gearbox 20 and other parts of the power train. Said numbers of gear steps N are the number of downshifts or the number of upshifts which the gearbox 20 is respectively adapted to effecting at a downshift point or an upshift point. A downshift point represents a first engine speed at which the gearbox 20 is adapted to effecting a downshift, and an upshift point represents a second engine speed at which the gearbox 20 is adapted to effecting an upshift. The system is further adapted to determining said number of gear steps N on the basis of a predicted acceleration a for the vehicle during a time period T.

Figure 4:
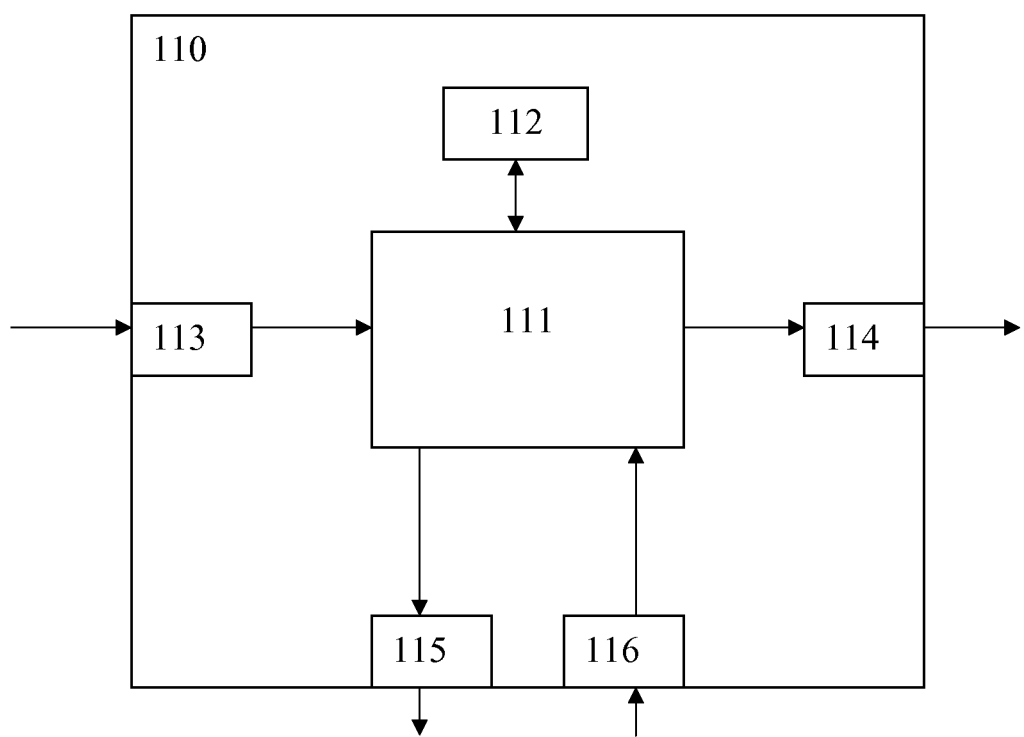
FIG. 4 depicts a control unit forming part of a system according to the invention.

FIG. 4 depicts schematically a control unit 110. The control unit 110 comprises a calculation unit 111 which may take the form of substantially any suitable type of processor or microcomputer, e.g. a circuit for digital signal processing (digital signal processor, DSP) or a circuit with a predetermined specific function (application specific integrated circuit, ASIC). The calculation unit 111 is connected to a memory unit 112 which is incorporated in the control unit 110 and which provides the calculation unit 111 with, for example, the stored program code and/or the stored data which the calculation unit 111 needs for it to be able to perform calculations. The calculation unit 111 is also adapted to storing partial or final results of calculations in the memory unit 112.

The control unit 110 is further provided with devices 113, 114, 115, 116 for respectively receiving input signals and sending output signals. These input and output signals may comprise waveforms, pulses or other attributes which the signal receiving devices 113, 116 can detect as information and which can be converted to signals processable by the calculation unit 111. The calculation unit 111 is then provided with these signals. The signal sending devices 114, 115 are adapted to converting signals received from the calculation unit 111 in order to create, eg by modulating the signals, output signals which can be transmitted to other parts of the system for determination of downshift and upshift points. One skilled in the art will appreciate that the aforesaid computer may take the form of the calculation unit 111 and that the aforesaid memory may take the form of the memory unit 112.

Each of the connections to the devices for respectively receiving input signals or sending output signals may take the form of one or more from among the following: cable, data bus, e.g. CAN (controller area network) bus, MOST (media orientated systems transport) bus or some other bus configuration, or a wireless connection. The connections 70, 80, 90, 100 in FIG. 1 may also take the form of one or more of these cables, buses or wireless connections.

Specialists will also appreciate that the above system may be modified according to the various embodiments of the method for determination of numbers of gear steps N according to the invention. The invention relates also to a motor vehicle 1, e.g. a truck or bus, comprising at least one system for determination of numbers of gear steps N according to the invention.

Finally, the present invention is not limited to its embodiments described above, but relates to and comprises all embodiments within the scope of protection of the attached independent claims.

The invention claimed is:

1. A method for determination of numbers of gear steps N for a gearbox in a motor vehicle,
wherein the vehicle comprises an engine connected to drive the gearbox, the numbers of gear steps N being the number of downshifts or the number of upshifts which the gearbox respectively effects at an upshift point or a downshift point, and
wherein a downshift point represents a first engine speed at which the gearbox effects a downshift, and an upshift point represents a second engine speed at which the gearbox effects an upshift,
the method comprising the step of:
determining numbers of gear steps N on the basis of a predicted acceleration a for the engine speed of the motor vehicle during a time period T.

2. The method according to claim 1, in which the time period T is the time which the engine takes to change from a first engine speed $\omega_1$ at a first point in time to a second engine speed $\omega_2$ at a second point in time.

3. The method according to claim 2, in which the first point in time is a current point in time and the second point in time is a point in time at which a downshift or upshift is initiated.

4. The method according to claim 2, in which the time period T is determined according to $$T = \int_{\omega_1}^{\omega_2} \frac{m + I_e \frac{i^2}{r^2}}{M_e - \frac{F_{res} r}{i}} d\omega$$

where $M_e$ is a torque for the flywheel of the engine, $I_e$ is the moment of inertia of the engine and $F_{res}$, r, i and m are respectively a running resistance, a wheel radius, a total transmission ratio and a weight for the vehicle.

5. The method according to claim 1, in which the acceleration a is a predicted mean acceleration of the motor vehicle during the time period T.

6. The method according to claim 2, in which the acceleration a is predicted as $$a = \frac{\Delta\omega}{T}$$

where $\Delta\omega = \omega_2 - \omega_1$.

7. The method according to claim 1, wherein the acceleration a is predicted in real time.

8. The method according to claim 1, wherein the acceleration a is used as a threshold value for acceleration for use in determining the numbers of gear steps N.

9. The method according to claim 1, wherein the numbers of gear steps N range from one to eight.

10. The method according to claim 1, further comprising controlling the gearbox by a control unit and wherein the gearbox is an automatic gearbox or an automated manual gearbox comprising a plurality of gears, and the motor vehicle is within the category of trucks and buses.

11. A method for using numbers of gear steps N in conjunction with corresponding one or more downshift and upshift points when changing gear in a gearbox in a motor vehicle, wherein numbers of gear steps N are determined according to a method for determination of numbers of gear steps N for a gearbox in a motor vehicle,
wherein the vehicle comprises an engine connected to drive the gearbox, the numbers of gear steps N being the number of downshifts or the number of upshifts which the gearbox respectively effects at an upshift point or a downshift point, and wherein a downshift point represents a first engine speed at which the gearbox effects a downshift, and an upshift point represents a second engine speed at which the gearbox effects an upshift,
the method for using numbers of gear steps N and the method for determination of numbers of gear steps N comprising the steps of:
determining numbers of gear steps N on the basis of a predicted acceleration a for the motor vehicle during a time period T, and
controlling the gearbox, by a control unit, to select a number of gear steps from the numbers of gear steps N.

12. A non-transitory computer-readable storage medium on which a computer program is stored, the computer program comprising program code which causes a computer to effect a method for determination of numbers of gear steps N for a gearbox in a motor vehicle,
wherein the vehicle comprises an engine connected to drive the gearbox, the numbers of gear steps N being the number of downshifts or the number of upshifts which the gearbox respectively effects at an upshift point or a downshift point, and
wherein a downshift point represents a first engine speed at which the gearbox effects a downshift, and an upshift point represents a second engine speed at which the gearbox effects an upshift, the method comprising the step of:
determining numbers of gear steps N on the basis of a predicted acceleration a for the engine speed of the motor vehicle during a time period T
when the program code is executed in the computer.

13. The non-transitory computer readable storage medium according to claim 12, wherein the non-transitory computer-readable storage medium is within a category which comprises a ROM (read-only memory), a PROM (programmable ROM), an EPROM (erasable PROM), a flash memory, EEPROM (electrically erasable PROM) and a hard disc unit.

14. A system for determination of numbers of gear steps N, in a gearbox in a motor vehicle, which vehicle comprises an engine connected to drive the gearbox, the system comprising at least one control unit controlling the number of gear steps N which is a number of downshifts or a number of upshifts which the gearbox respectively effects at an upshift point or a downshift point,
wherein a downshift point represents a first engine speed at which the gearbox effects a downshift, and an upshift point represents a second engine speed at which the gearbox effects an upshift, and
wherein the system determines the numbers of gear steps N on the basis of a predicted acceleration a for the engine speed of the motor vehicle during a time period.

15. A motor vehicle comprising at least one system for determination of numbers of gear steps N, in a gearbox in a motor vehicle, which vehicle comprises an engine connected to drive, the gearbox, the system comprising at least one control unit controlling the number of gear steps N being a number of downshifts or a number of upshifts which the gearbox respectively effects at an upshift point or a downshift point,
wherein a downshift point represents a first engine speed at which the gearbox effects a downshift, and an upshift point represents a second engine speed at which the gearbox effects an upshift, and
wherein the system determines the numbers of gear steps N on the basis of a predicted acceleration a for the engine speed of the motor vehicle during a time period.

* * * * *